US011507923B2

(12) United States Patent
Trehan et al.

(10) Patent No.: US 11,507,923 B2
(45) Date of Patent: Nov. 22, 2022

(54) METHOD AND SYSTEM FOR DECENTRALIZED TRANSACTION MANAGEMENT IN PROJECT RESOURCING

(71) Applicant: Infosys Limited, Bangalore (IN)

(72) Inventors: Rohini Trehan, Chandigarh (IN); Gopikrishnan Konnanath, Mangalore (IN)

(73) Assignee: INFOSYS LIMITED, Bangalore (IN)

( * ) Notice: Subject to any disclaimer, the term of this patent is extended or adjusted under 35 U.S.C. 154(b) by 148 days.

(21) Appl. No.: 17/141,781

(22) Filed: Jan. 5, 2021

(65) Prior Publication Data

US 2021/0209557 A1 Jul. 8, 2021

(30) Foreign Application Priority Data

Jan. 6, 2020 (IN) .............................. 202041000439

(51) Int. Cl.
*G06Q 10/10* (2012.01)
*G06F 16/27* (2019.01)
(Continued)

(52) U.S. Cl.
CPC ........... *G06Q 10/103* (2013.01); *G06F 16/27* (2019.01); *G06Q 20/389* (2013.01);
(Continued)

(58) Field of Classification Search
CPC .. G06Q 10/103; G06Q 20/389; G06Q 30/018; G06Q 40/02; G06Q 40/04;
(Continued)

(56) References Cited

U.S. PATENT DOCUMENTS 7,756,764 B1 7/2010 Horne et al.
8,712,877 B2 4/2014 Stremler et al.
(Continued)

OTHER PUBLICATIONS

K. Christidis and M. Devetsikiotis, "Blockchains and Smart Contracts for the Internet of Things," in IEEE Access, vol. 4, pp. 2292-2303, 2016, doi: 10.1109/ACCESS.2016.2566339. (Year: 2016).*
(Continued)

*Primary Examiner* — Elda G Milef
(74) *Attorney, Agent, or Firm* — Troutman Pepper Hamilton Sanders LLP (Rochester)

(57) ABSTRACT

A method and system for decentralized transaction management in project resourcing is provided that ensures transparent and decentralized tracking of data across all stakeholders. It also provides ease of compliance for organizations on one hand, and ease of monitoring for the administrators on the other. Multiple beneficiaries and benefactors are registered with a primary administrator. Each beneficiary has a list of projects listed. A benefactor identifies a project which he wants to resource. The benefactor virtually transfers a unit of resource to a secondary administrator, for the identified project and receives credit points in exchange of the units of resource. The benefactor approves transfers of credit points to the identified project of a beneficiary. The beneficiary redeems the required credit points with the resource units. The secondary administrator will also validate the resources received by the beneficiary in exchange for the credit points.

12 Claims, 5 Drawing Sheets

(51) Int. Cl.
  *G06Q 20/38* (2012.01)
  *G06Q 30/00* (2012.01)
  *G06Q 40/02* (2012.01)
  *G06Q 40/04* (2012.01)
  *G06Q 30/02* (2012.01)
(52) U.S. Cl.
  CPC ........... *G06Q 30/018* (2013.01); *G06Q 40/02* (2013.01); *G06Q 40/04* (2013.01); *G06Q 20/38215* (2013.01); *G06Q 30/0279* (2013.01); *G06Q 2220/00* (2013.01)
(58) Field of Classification Search
  CPC ......... G06Q 20/38215; G06Q 2220/00; G06Q 20/02; G06Q 20/102; G06Q 20/065; G06F 16/27; H04L 9/3239; H04L 9/50
  See application file for complete search history.

(56) References Cited

U.S. PATENT DOCUMENTS

| | | | |
|---|---|---|---|
| 2015/0142688 A1 | 5/2015 | Jackson et al. | |
| 2018/0218176 A1* | 8/2018 | Voorhees | G06Q 20/02 |
| 2019/0318399 A1* | 10/2019 | Davis | H04L 9/3239 |
| 2020/0090188 A1* | 3/2020 | Wince | H04L 9/50 |
| 2020/0151686 A1* | 5/2020 | Komandur | H04L 9/3239 |
| 2020/0167196 A1* | 5/2020 | Smith | G06F 9/5072 |

OTHER PUBLICATIONS

Vinayak, Muskan et al., "Design and Implementation of Financial Smart Contract Services on Blockchain", 2019 IEEE 10th Annual Information Technology Electronics and Mobile Communication Conference, IEEE, Oct. 17, 2019, pp. 1023-1030.

Vinayak, Muskan et al., "Analyzing Financial Smart Contracts for Blockchain", 2018 IEEE International Conference on Internet of Things and IEEE Green Computing and Communications an IEEE Cyber, Physical and Social Computing and IEEE Smart Data, IEEE, Jul. 30, 2018, pp. 1701-1706.

Bharathan, Vipin et al., "Hyperledger Architecture, vol. 11 Smart Contracts", Apr. 26, 2018, https://www.hyperledger.org/wp-content/uploads/2018/04/Hyperledger_Arch_WG_Paper_2_SmartContracts.pdf.

European Search Report for corresponding EP Application No. 21150103.6, dated May 21, 2021.

CSR Services—Corporate Social Responsibility Consulting Firm, https://www.helpyourngo.com/csr-services.php, last accessed Jan. 5, 2021.

* cited by examiner

METHOD AND SYSTEM FOR DECENTRALIZED TRANSACTION MANAGEMENT IN PROJECT RESOURCING

This application claims the benefit of Indian Patent Application Serial No. 202041000439 filed Jan. 6, 2020, which is hereby incorporated by reference in its entirety.

FIELD

The present disclosure relates to managing transactions, and more specifically managing credit exchange while resourcing a project, by leveraging a distributed ledger technology platform.

BACKGROUND

An online transaction includes various processes, parameters and stakeholders. Many transactions also handle allocation or transfer of credit points. In the current offline scenario at any stage of transaction or with any stakeholder there can be erroneous entries or deliberate fraudulent entries for laundering of resources. These cause non-compliance, missing updates on the transaction values, and loss of funds to the exchequer. Lack of transparency, incorrect/misleading information, impacts processes and credibility of an organization.

Project resourcing requires involvement of several benefactors who can declare the resources that they can commit to a project. However often the declared resource value differs from the actual resource value that is transferred, or the resource actually never reaches the purpose for which it was claimed to have been transferred, instead, it gets routed back through illegal channels to the sender. Hence, such transactions and data are prone to manipulations and lead to lot of discrepancies. There are disparate applications, often lacking reconciliation, being tracked by various departments with no means of direct visibility into the actual transaction values. Lack of reconciliation between actual values reported versus declared resource value for a large section of customers has led to lot of mismanaged data and frauds. In this scenario, where there are many stakeholders, credit exchanges, and multiple transactions, in order to ensure compliance to regulations, it is required to have a common platform which offers seamless and secure transaction management that is available real time for all tracking and facilitate transparent and faster transaction across stakeholders within the ecosystem. Therefore a transparent and decentralized tracking of data across all stakeholders is required that will ensure ease of compliance for organizations on one hand, and ease of monitoring for the administrators on the other.

SUMMARY

A method for decentralized transaction management for resourcing a project by one or more benefactors using a distributed ledger network, comprising identifying a project from one or more projects in a beneficiary repository, in the network; transferring a predecided unit of resource to a secondary administrator for the identified project, using smart contracts in the network; receiving one or more credit points from the secondary administrator, based on the transferred resource units using smart contracts; and transferring predecided credit points to the beneficiary on the network; redeeming the transferred credit points by the beneficiary, in exchange of corresponding units of resources; validating the transferring of the predecided credit points, and the transferring of the redeemed resource units using smart contracts.

A distributed ledger network based system for decentralized transaction management for a project resourcing by one or more benefactor nodes in the network, comprising, one or more beneficiary nodes comprising one or more projects stored in a repository, the one or more benefactor nodes identifying a project from the one or more projects; one or more smart contracts in the network configured to, transferring a predecided units of resource to a secondary administrator node in the network, for the identified project; transferring one or more credit points to the benefactor node; transferring predecided credit points from the benefactor node to the beneficiary node; on redeeming the transferred credit points by the beneficiary, transferring a corresponding units of resource to the beneficiary; and authenticating the transferring of credit points, and the transferring of the units of resource.

A non-transitory computer-readable storage medium storing computer-executable instructions that when executed cause a computing system to perform a method, the method comprising, identifying a project from one or more projects in a beneficiary repository, in the network; transferring a predecided units of resource to a secondary administrator for the identified project, using smart contracts in the network; transferring one or more credit points to the benefactor by the secondary administrator; transferring a predecided credit point by the benefactor to beneficiary redeeming the credit points by the beneficiary, in exchange of corresponding units of resources; and validating the transferring of the predecided credit points, and the transferring of the resource value by smart contract.

DETAILED DESCRIPTION

Figure 1:
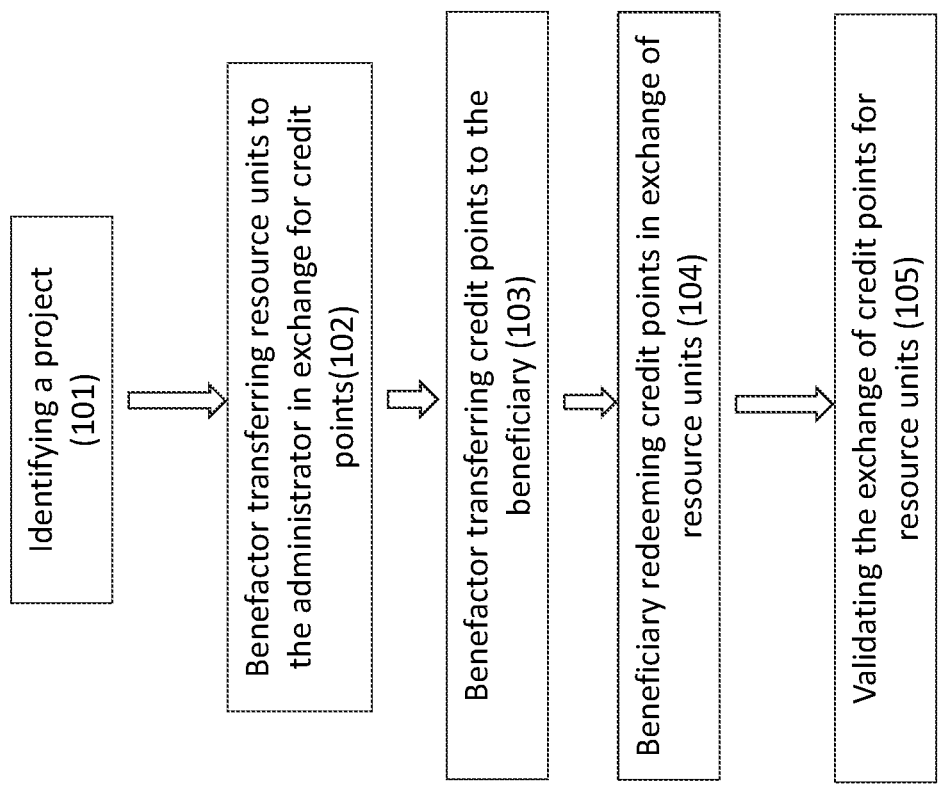
FIG. 1 is a flowchart of an exemplary method briefly describing the method of transaction management in project resourcing.

Exemplary steps of the present disclosure will now be very broadly described along with the description of FIG. 1. The disclosure describes a process for managing transactions in project resourcing.

In an example, multiple beneficiaries and benefactors are registered with a primary administrator. Each beneficiary has a list of projects listed. A benefactor identifies a project which he wants to resource (101). The benefactor virtually transfers a unit of resource to a secondary administrator, for the identified project, as per an initially decided value and receives credit points in exchange of the units of resource (102). The benefactor may also notify a transfer of resource value to the secondary administrator. The secondary administrator, the benefactor and beneficiaries may have their repositories for the credit points. The benefactor transfers credit points to the identified project of a beneficiary (103).

The beneficiary redeems the required credit points with the resource units (104). The secondary administrator will also validate the resources received by the beneficiary in exchange for the credit points (105).

Figure 2:
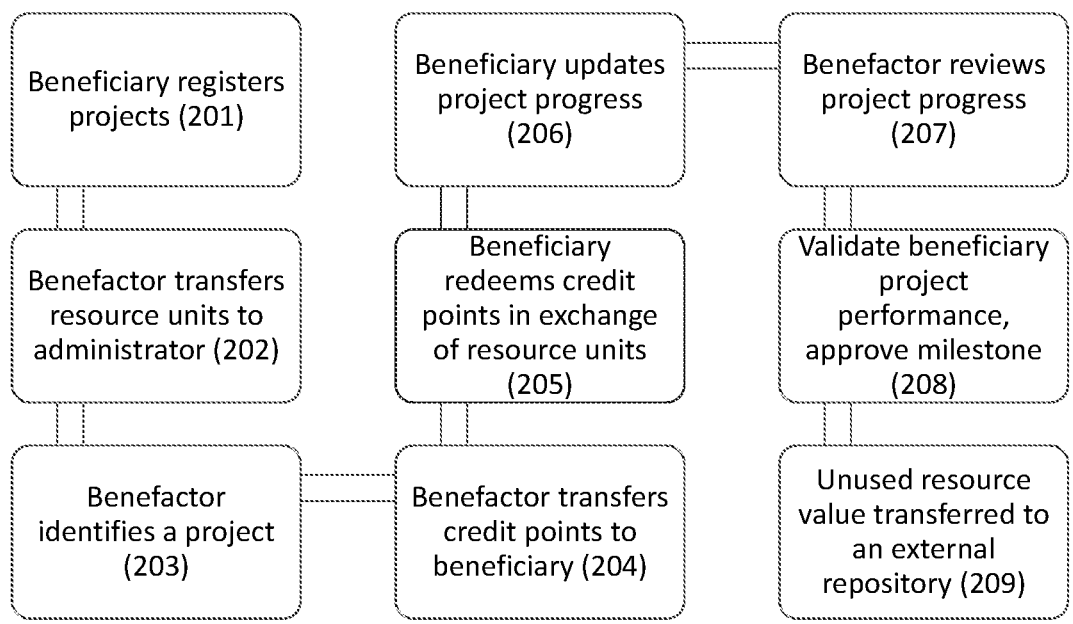
FIG. 2 is a flowchart of an exemplary method describing the details of the method of transaction management in project resourcing.

The working of the process along with various examples and features will now be explained in detail along with description of FIG. 2.

In an example, a primary administrator of the resourcing system implements the process. A primary administrator maybe a computing machine or device with appropriate access and repositories. In an example, the primary administrator may be a network of computing machines and a server machines coordinates with the resourcing system. The stakeholders of the resourcing system may be registered with the primary administrator. A secondary administrator may be registered with the primary administrator for regulating the process of resourcing. A secondary administrator maybe a computing machine or device with appropriate access and repositories. In an example, the secondary administrator may be a network of computing machines and a server machines coordinates with the resourcing system.

In an example, users of the resourcing system are registered with the primary administrator. The users can register using an appropriate unique identifier. The users can be stakeholders of the project resourcing system. One set of the users can be the benefactors who will provide resources for a project. The benefactor can be a network of user machine or devices, or a single machine or device. The benefactors register with the primary administrator using a unique identifier. In an example the unique identifier can be the PAN number of the user. In another example, a network Id can be used as a unique identifier to register. Accordingly, as per the environment of implementation of the present disclosure, a suitable unique identifier is used for registration.

Another set of users can be the beneficiary who receives the resources from the benefactors. The beneficiary can be a network of user machine or devices, or a single machine or device. The beneficiary registers with the primary administrator using a unique identifier. In an example the unique identifier can be the PAN number of the user. In another example, a network Id can be used as a unique identifier to register. Accordingly, as per the environment of implementation of the present disclosure, a suitable unique identifier is used for registration.

In one example, the beneficiary may maintain a list of its projects which need resources (201). Alternatively, the beneficiary may list the future projects. The projects open for resourcing are visible to the benefactors. The benefactor transfers appropriate resource units to the administrator (202). It identifies a project from the list of projects of beneficiary (203). In one example, as per the implementation environment of the present technology, the benefactors may be required mandatorily to provide a minimum amount of resources to the desired projects of the beneficiary.

In one example the resources can be any physical, digital or virtual assistance to the beneficiary. It may include physical resources including computing resources, data, infrastructure or components, or also human working resources. In one example resources may also include digital credits such as funds or a fiat currency. Resources provided by benefactors can be in any other such form that can be provided to a beneficiary as may be generally known and understood.

In one example each of the stakeholders registered with the primary administrator may have a credit repository. The stakeholders maybe benefactors, beneficiary and secondary administrator. In an example, credit points may be issued by the primary administrator. The credit points maybe in any user desired digital form or any data structure form. A Benefactor may identify the projects from list provided by the beneficiary. It may donate resources by digitally transferring a calculated units of resources to the secondary administrator. In an example, the benefactor notifies transfer of resources to the beneficiary.

The units of resources to be transferred can be decided as per the requirements of the users, or as per the implementation environment requirement where this technology is used. In another example, the benefactors may be mandated to transfer a calculated number of units of resources. The calculations for deciding units of resources may be based on the total available resources of the benefactor along with other suitable parameters. It can be based on the other asset value of the benefactors as well including available computing resources, components, or digital resources.

In one example, the benefactor is simultaneously provided a notification for approving transfer of the credit point units to the beneficiary's repository. The benefactor may then approve the transfer. In one example, when a benefactor identifies a project it also automatically approves transfer of the credit points to the beneficiary. The secondary administrator transfers corresponding credit points into the beneficiary repository (204). The amount of credit points to be transferred may be user configurable. It may be calculated by the secondary administrator depending on the appropriate parameters related to the stakeholders.

The beneficiary may then redeem the required amount of credit points in exchange of the units of resources (205). The amount of credit points to be redeemed maybe configured by the beneficiary. It may also be configured as part of a mandatory requirement. Beneficiary may be required to redeem a minimum amount of credit points.

Once a beneficiary receives the resource units from a benefactor, the beneficiary is required to provide progress status of the identified project (206). The progress status of the project can be displayed or notified or can be sent via communication means to the intended recipients. In one example the progress is provided to the benefactor and the secondary administrator. This can be configured as per the user requirements.

The progress provided by the beneficiary may be reviewed by the benefactor (207) and also the secondary administrator, in real time. As and when the beneficiary posts the progress, the benefactor keeps reviewing the expending of the resources which was provided to the beneficiary by the benefactor. The benefactor can submit dissatisfactory review in case the progress reported by the beneficiary is not commensurate with the resource units released. In this case the beneficiary's progress may not get approved and the beneficiary will be unable to access resources for subsequent progress in the project. An adverse feedback such as this could impair the credibility of the beneficiary in procuring any future resources as well.

In one example, multiple benefactors would identify multiple beneficiary projects and provide resources. All these projects updates are notified and simultaneously reviewed by the benefactor and the secondary administrator as well. Accordingly, the resources expensed by the beneficiary are monitored in real time by the benefactors and the secondary administrator as well (208). In another example, the benefactor is also provided benefits in exchange of the resources provided by it, by the secondary administrator. The benefits provided to the benefactor can be in the form of credit points, digital resources, funds or in the form of any other asset as configured by the user. The amount of benefits to be provided to the benefactor can be calculated by the secondary administrator as per the implementation environment of this technology. The calculation can be based on the assets of the benefactors, and/or along with resources provided by the benefactor. It can also be a fixed amount decided by the secondary administrator. It can also be combination of all the above parameters.

In one example, if the beneficiary is unable to use some resources provided by the benefactor, for some amount of time, the resources are moved to a third party repository, or an external repository (210). In one example the resources are moved to an Escrow account. In another example, further rules can be defined to allow a different time window to the beneficiary to consume the available resources. Finally, after this time window also lapses, the beneficiary may lose access to these resources and they can be leveraged by the secondary administrator or another appropriate stakeholder to be circulated for usage by all beneficiaries in the network.

Figure 3:
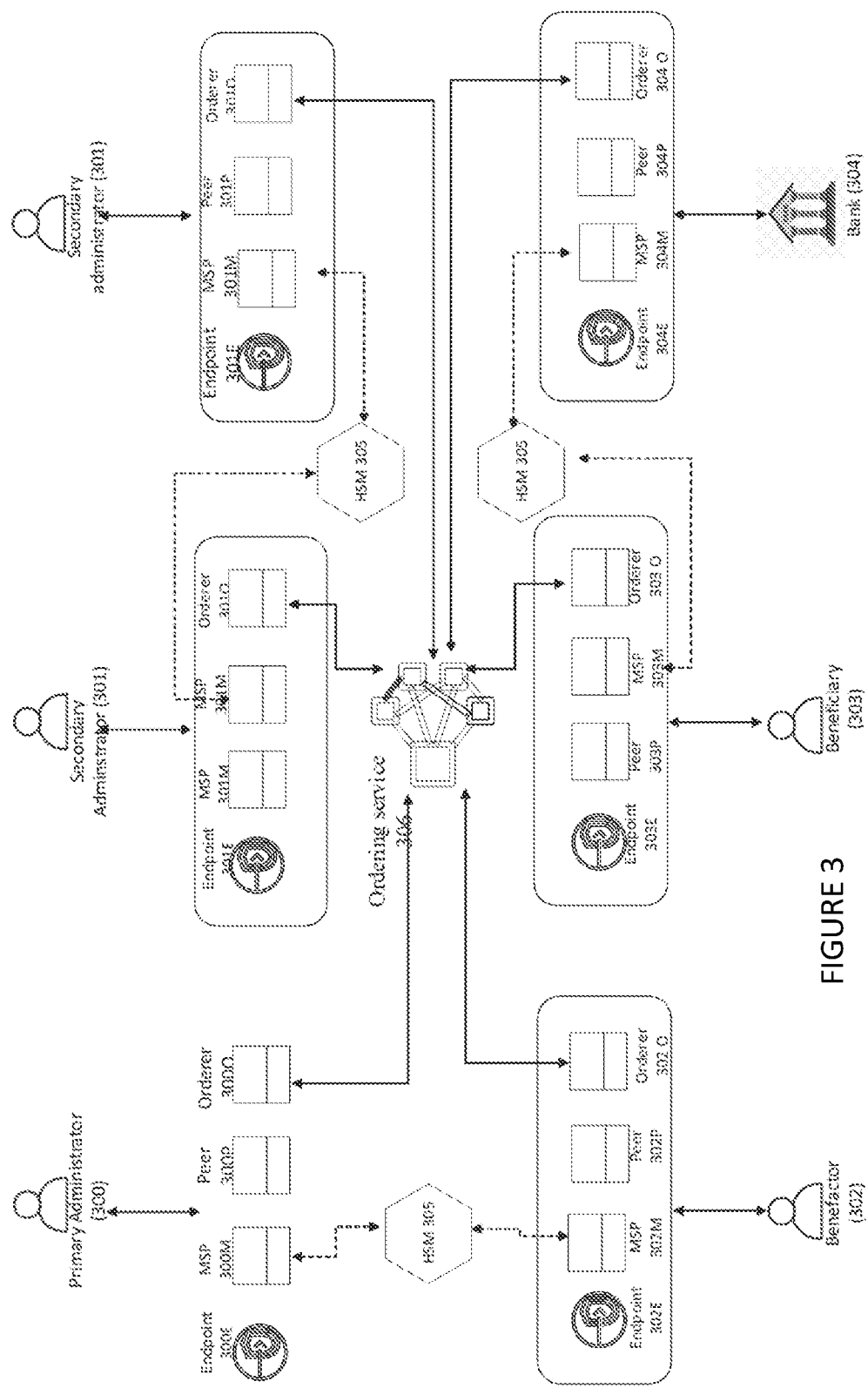
FIG. 3 is a schematic environment of a distributed ledger system to implement the system as disclosed herein.

FIG. 3 describes an exemplary environment for the implementation of the present disclosure.

In an example, the present disclosure is implementing on a Distributed Ledger network deployed on a public cloud. It may be implemented using a Blockchain network. The blockchain network allows users, stakeholders, benefactors and the beneficiaries to be assigned individual nodes as peers. The primary and secondary administrators will endorse and validate the transaction done by users on the blockchain network. Blockchain network leverages a highly-modular and configurable architecture. Deployment on Cloud would assure scalability on need basis.

In one example, the present disclosure is integrated with internal systems of primary administrator and second administrator by loosely coupling by means of adaptors and micro services. All interaction with systems outside of this disclosure may be asynchronous.

Blockchain's Certificate Authority may provide certificates for the users which will enable validation of submitted transaction, signing and data encryption. Communication between peers will happen through "Channels" which can be configured to provide necessary access restrictions and data visibility to relevant and required stakeholders. A channel may have a limited number of subscribers, to ensure data proliferation only on a need to know basis, and creates access restrictions. In one example, these channels encapsulate the rules and algorithms agreed by the network members and controls access to network resources. This may include the units of credit points to be transferred, or incentive and similar configurable amounts for the benefactors and the beneficiaries.

Blockchain's Chain code will enable secondary administrator to manage the life cycle of the credits, movement of resources, and ensure following the rules and calculations set by the users. In one example, the system may offer an elaborate Reporting dashboard. The Reporting dashboard may enable the administrators to monitor compliance by eligible benefactors where its mandatory to resource beneficiary projects. The dashboard may also identify non-compliant benefactors and send out notifications to them. The dashboard may also monitor resources deposited and expended via the platform thereby preventing any manipulation of resources. The dashboard further may also allow administrators to audit proof of resource usage as submitted by benefactors. The reports can depict high level trends of compliance, resource usage, as well as enable administrators to do a drill-down review. Along with making the compliance check faster and easier Blockchain enables on-boarding of new peers and enables extensibility of the current model to a larger environment with multiple stakeholders.

The technical architecture of the present disclosure will now be described along with more specific details.

In one example, each stakeholder governs one or more network peers (nodes) and depends on a membership service provider (MSP) to issue identities and certificates for the peers as well as clients (other stakeholders logging into a node) for smart contract access privileges to be applied. In one example, network peers maybe server nodes in the blockchain network. In that sense the MSP may provide an access list for the stakeholders and manages the Authentication and Authorization of the stakeholders transacting through a peer (node). In one example, the set of peers, the stakeholders they belong to and the membership service providers serving each stakeholder may be decided beforehand so that the appropriate services can be installed and run on those machines. In one example clients maybe the beneficiaries and benefactors and other related entities who may not actually map to a peer or node.

In an example, the primary administrator acts as a network operator. It may also provide infrastructure such as Cloud deployment of DLT platform for the implementation of the present disclosure. The primary administrator may also create the public cloud infrastructure for the hardware security management to issue and maintain certificates to enforce authentication and authorization towards multi-factor-authentication. In another example it may also provide on-boarding services through KYC, define endorsement rules for validation, writing and publish smart contracts and support and maintenance of blockchain network.

In an example, the second administrator processes identifier and authentication services for onboarded Benefactors, Beneficiaries to the network. It also provides service endpoint. The service endpoint may provide API interface for system integration with existing systems operational for the administrators and other entities in the same implementation environment for real-time settlement for various transactions (See, next paragraph below).

Referring to FIG. 3, the blockchain network includes the key entities like primary administrator (300), secondary administrator (301), Benefactor (302), Beneficiary (303) and Bank (304). Each entity governs one or more network peers (300P . . . 304P) and depends on a membership service provider (300M . . . 304M) to issue identities and certificates for the peers as well as clients for smart contract access privileges. The set of peers, the entities they belong to and the membership service providers serving each entity must be decided beforehand so that the appropriate services can be installed and run on those machines.

The primary administrator (300) is a network operator and may be responsible for, along with other things, providing infrastructure. The DLT platform deployment on Cloud may be a scalable architecture to ensure high performance and transaction throughput. The primary administrator may also look into including ordering services (306) clustering for high availability;

creating the Public Cloud Infrastructure for the Hardware Security Management (305) to issue and maintain certificates;

providing on-boarding services through KYC;
defining endorsement policy for validation;
writing and publishing smart contracts; and
supporting and maintenance of network.

The secondary administrator (301) in the distributed ledger is configured to handle, KYC service for onboarding Benefactors/Beneficiary to network; and provide service endpoint (300E . . . 304E) for real-time settlement of obligations of the benefactor in the event of mandatory resourcing requirements, balance sheet submission of the beneficiary towards incentives.

The secondary administrator may also be configured for providing service endpoint for issuing and maintaining credit repository and providing service endpoint for exchange of unit of resources to unit of credit points and vice versa.

The hardware security management (305) provides a secure storage. Besides the core blockchain components, the Enterprise Membership option provides an infrastructure with secure data storage (for data at rest) and secure communications (using TLS—Transport Layer Security, for data in motion) and high availability. While Fabric networks share these infrastructure resources, isolation is provided for the Fabric component nodes in a network, and each node executes in a secure docker container that protects the execution environment.

Connecting TLS encryption and proper certificate handling are the most important aspects of functional security. Blockchain data is secure by design, however, the functional part of this security relies on proper configuration of Hyperledger certificate authority (CA) with proper key management.

The platform offers Attribute-Based Access Control defined based on specific attributes of the various entities including Benefactor/Beneficiary, which allows smart contracts to operate based on these specific client attributes. This, along with enabling TLS client authentication for facilitating a security protocol to ensure privacy and data security for communications over the Internet on peer nodes (300P-304P), sets the overall trust and Security level in the whole network reasonably high.

Ordering service (306) provides a crash fault tolerant (CFT) ordering. It is possible for the ordering service to comprise several ordering nodes that are under the control of different entities on the network.

The administrators act as endorsers and will execute endorsement policies specified in the chaincode definition, which is agreed to by channel members and then committed to a channel.

The membership service provider (300M-304M) abstracts away all cryptographic mechanisms and protocols behind issuing and validating certificates, and user authentication. This provides modularity of membership operations, and interoperability across different membership standards and architectures.

Figure 4:
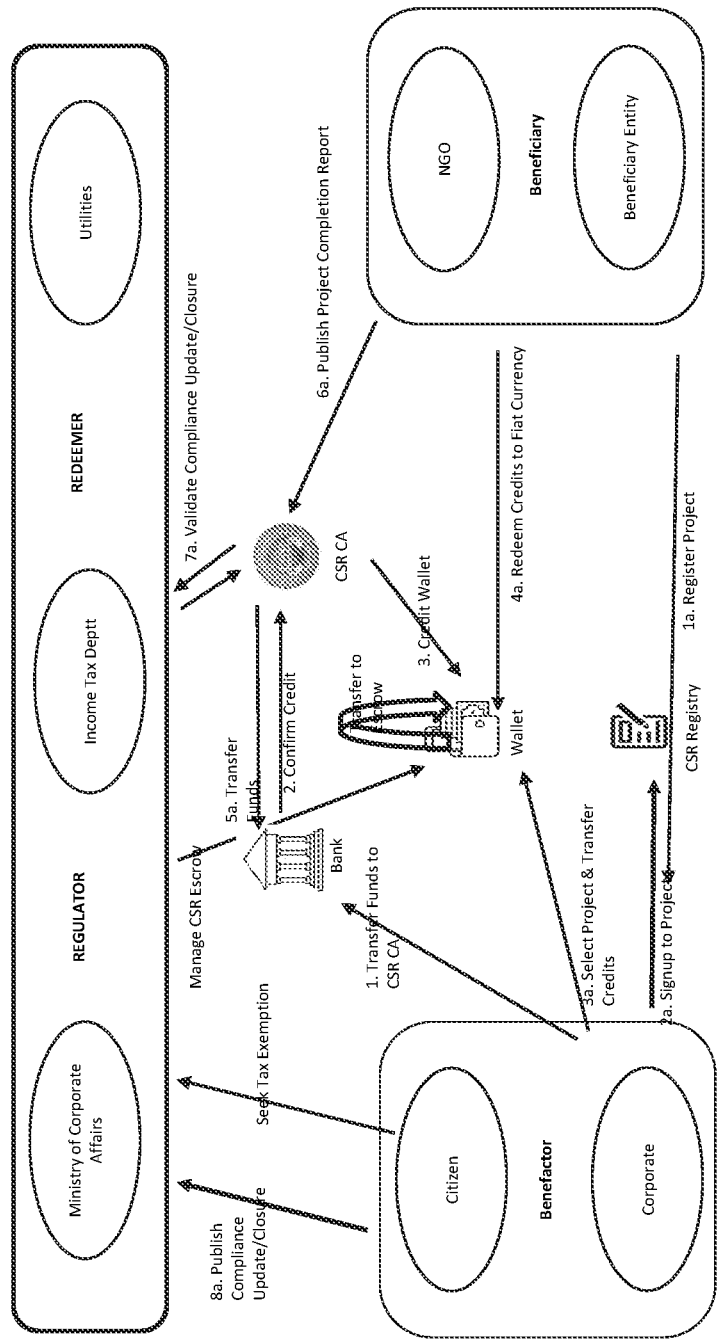
FIG. 4 is a schematic diagram showing an example of implementation of the process as disclosed herein.

The technology will now be described using an example of implementation of the process as disclosed herein, using FIG. 4. The implementation explained below is only by way of example to explain and illustrate the working, implementation and various features of the process along with the examples. This implementation is no way limiting the scope of the present technology.

For the purpose of example and explanations, we have described the implementation of the technology in Corporate Social Responsibility (CSR) compliance. In an example primary administrator can be CSR Cell of the Ministry of Corporate affairs. The CSR drives the system as the Regulatory Authority. The secondary administrator maybe Department of Income Tax is enrolled as a Regulator to the present implementation. Benefactors register to the system, by validating respective PAN numbers with the Regulatory Authority. In this example benefactors can be corporates. Not-for-profit Organizations can enroll in the system as Beneficiaries.

Each stakeholder maintains a CSR Credits wallet on the network. CSR Credits are issued by the Regulatory Authority or a Credits Authority (CA). A Benefactor may donate funds by transferring a fiat currency amount in the Bank account of the CSR Credits Authority. In lieu of this amount, the CSR CA credits a corresponding amount of CSR Credits digital currency in the wallet of the Benefactor.

Beneficiaries register future projects in a CSR Registry. When a Benefactor selects a project, it approves transfer of corresponding CSR Credits to the wallet of the beneficiary that published the project. Fiat Currency funds in lieu of these credits are transferred to the Beneficiary Bank account for deployment on the project.

A Beneficiary will be required to post project milestone updates regularly. These can be reviewed real time by both the Benefactor as well as the Regulatory authorities.

The Regulatory Authority validates expending of benefactor funds in the shortlisted projects. This would facilitate real time compliance checks accomplished by the Regulators. Any tax exemptions due to the benefactor in lieu of CSR expenses can be settled real time by the Income Tax Department. The system can facilitate transparency in audit of balance sheets of the Beneficiaries.

Any funds that have been unused for 3 years since deposit can be automatically moved to the Escrow account also within the system via smart contracts, automatically enabling transparent monitoring for the Regulatory authority without any additional oversight expenses.

While the particular examples described herein may illustrate the disclosure in a particular domain, the broad principles behind these examples could be applied in other fields of endeavor. To facilitate a clear understanding of the present disclosure, illustrative examples are provided herein which describe certain aspects of the disclosure. However, it is to be appreciated that these illustrations are not meant to limit the scope of the disclosure, and are provided herein to illustrate certain concepts associated with the disclosure.

It is also to be understood that the present disclosure may be implemented in various forms of hardware, software, firmware, special purpose processors, or a combination thereof. Preferably, the present disclosure is implemented in software as a program tangibly embodied on a program storage device. The program may be uploaded to, and executed by, a machine comprising any suitable architecture.

Figure 5:
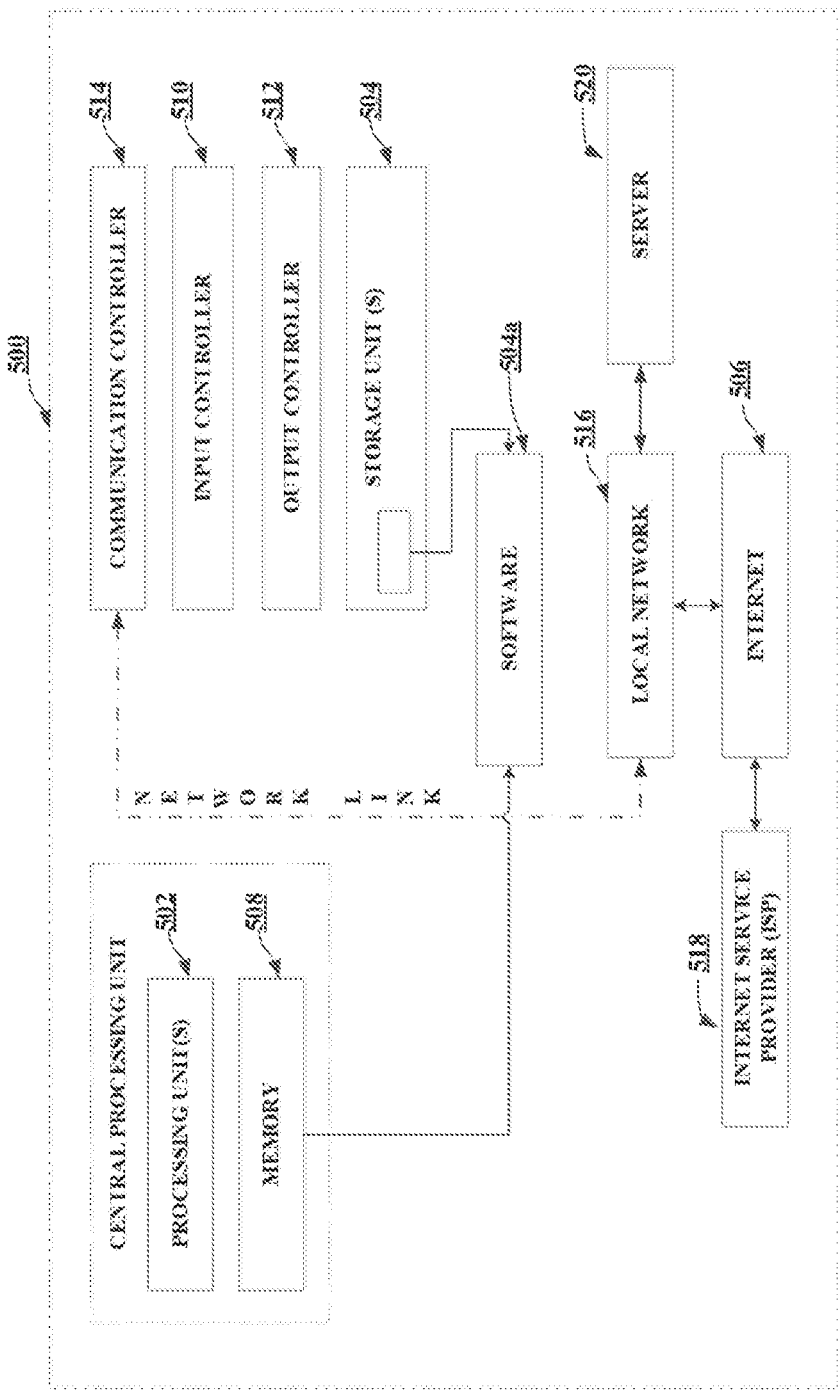
FIG. 5 is a schematic diagram illustrating a generalized example of a suitable computing environment for any of the disclosed examples.

A generalized example of a suitable computing environment for any of the disclosed examples will now be described along with the description of FIG. 5 is a block diagram of a computing device 500 to which the present disclosure may be applied according to an example of the present disclosure. The system includes at least one processor 502, designed to process instructions, for example computer readable instructions (i.e., code) stored on a storage device 504. By processing instructions, processing device 502 may perform the steps and functions disclosed herein. Storage device 504 may be any type of storage device, for example, but not limited to an optical storage device, a magnetic storage device, a solid state storage device and a non-transitory storage device. The storage device 504 may contain software 504a which is a set of instructions (i.e. code). Alternatively, instructions may be stored in one or more remote storage devices, for example storage devices accessed over a network or the internet 506. The computing device also includes an operating system and microinstruction code. The various processes and functions described herein may either be part of the microinstruction code or part of the program (or combination thereof) which is executed via the operating system. Computing device 500 additionally may have memory 508, an input controller 510, and an output controller 512 and communication controller 514. A bus (not shown) may operatively couple components of computing device 500, including processor 502, memory 508, storage device 504, input controller 510 output controller 512, and any other devices (e.g., network controllers, sound controllers, etc.). Output controller 510 may be operatively coupled (e.g., via a wired or wireless connection) to a display device (e.g., a monitor, television, mobile device screen, touch-display, etc.) in such a fashion that output controller 510 can transform the display on display device (e.g., in response to modules executed). Input controller 508 may be operatively coupled (e.g., via a wired or wireless connection) to input device (e.g., mouse, keyboard, touchpad, scroll-ball, touch-display, etc.) in such a fashion that input can be received from a user. The communication controller 514 is coupled to a bus (not shown) and provides a two-way coupling through a network link to the internet 506 that is connected to a local network 516 and operated by an internet service provider (hereinafter referred to as 'ISP') 518 which provides data communication services to the internet. Network link typically provides data communication through one or more networks to other data devices. For example, network link may provide a connection through local network 516 to a host computer, to data equipment operated by an ISP 518. A server 520 may transmit a requested code for an application through internet 506, ISP 518, local network 516 and communication controller 514. Of course, FIG. 1 illustrates computing device 500 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 500 may be one or more servers, for example a farm of networked servers, a clustered server environment, or a cloud network of computing devices.

In view of the many possible examples to which the principles of the disclosed invention may be applied, it should be recognized that the illustrated examples are only preferred examples of the invention and should not be taken as limiting the scope of the invention. Rather, the scope of the invention is defined by the following claims and their equivalents. We therefore claim all that comes within the scope of these claims and their equivalents.

What is claimed is:

1. A method for decentralized transaction management using a distributed ledger network, comprising:
   receiving via one or more subscriber channels, by a secondary administrator computing device, two or more transfers of different units of resource from each of two or more of a plurality of benefactor nodes for an identified online project in a beneficiary repository for one of a plurality of beneficiary nodes, based on at least one of a plurality of smart contracts, wherein the one or more subscriber channels are configured with one or more rules or algorithms to restrict access to the plurality of benefactor nodes, the plurality of beneficiary nodes and the secondary administrator computing device that have subscribed in the distributed ledger network;
   transferring via the one or more subscriber channels, by the secondary administrator computing device, one or more digital credit points to each of the two or more benefactor nodes based on the transferred units of resource using the at least one of the smart contracts on the distributed ledger network;
   monitoring, by the secondary administrator computing device, transfer of the digital credit points from the two or more of a plurality of benefactor nodes to the one of the beneficiary nodes on the distributed ledger network;
   monitoring, by the secondary administrator computing device, redemption of the transferred one or more digital credit points by the one of the beneficiary nodes for the transferred ones of the units of resource on the distributed ledger network; and
   validating, by the secondary administrator computing device, based on blockchain code associated with the at least one of the smart contracts the transferred one or more digital credit points and the redeemed ones of the units of resource to monitor in real time compliance by the two or more of a plurality of benefactor nodes and the one of the beneficiary nodes using the at least one of the smart contracts on the distributed ledger network.

2. The method as claimed in claim 1, wherein the benefactor nodes, and the beneficiary nodes are registered at a user repository in a primary administrator computing device, using a unique identifier.

3. The method as claimed in claim 1, further comprising:
   receiving, by the secondary administrator computing device, a periodic update on a status related to the two or more of the benefactor nodes of the identified online project, by the one of the beneficiary nodes;
   reviewing, by the secondary administrator computing device, the updated status in real time;
   periodically tracking noncompliance, by the secondary administrator computing device, in real time; and
   periodically tracking, by the secondary administrator computing device, usage of the resource units by the one of the beneficiary nodes.

4. The method as claimed in claim 1, wherein an incentive is provided to the benefactor nodes, based on the unit of resource transferred to the secondary administrator computing device.

5. The method as claimed in claim 1, wherein an incentive is provided to the benefactor nodes, based on the unit of resource transferred to the secondary administrator computing device.

6. A distributed ledger network based system for decentralized transaction management for project resourcing in the network, comprising, at least one secondary administrator computing device in the network configured to:
   receive via one or more subscriber channels at the secondary administrator computing device two or more transfers of different units of resource from each of two or more of a plurality of benefactor nodes for an identified online project in a beneficiary repository for one of a plurality of beneficiary nodes based on at least one of a plurality of smart contracts, wherein the one or more subscriber channels are configured with one or more rules or algorithms to restrict access to the plurality of benefactor nodes, the plurality of beneficiary nodes and the secondary administrator computing device that have subscribed in the distributed ledger network;
   transfer via the one or more subscriber channels with the secondary administrator computing device one or more digital credit points to the each of the two or more benefactor nodes based on the transferred units of resource using the at least one of the smart contracts on the distributed ledger network;

monitor with the secondary administrator computing device transfer of the one or more digital credit points from the two or more of the benefactor nodes to the one of the beneficiary nodes on the distributed ledger network;

monitor with the secondary administrator computing device redemption of the transferred one or more digital credit points by the one of the beneficiary nodes for the transferred units resource on the distributed ledger network resource to the one of the beneficiary nodes; and authenticate with the secondary administrator computing device, in real time, based on blockchain code associated with the at least one of the smart contracts, the redemption of the transferred one or more digital credit points for the redeemed ones of the units of resource to monitor in real time compliance by the two or more of a plurality of benefactor nodes and the one of the beneficiary nodes using the at least one of the smart contracts on the distributed ledger network.

7. The system as claimed in claim 6, wherein the benefactor nodes and the beneficiary nodes are registered at a user repository in a primary administrator node, using a unique identifier.

8. The system as claimed in claim 6, further comprising:
receiving a period update on a status related to the two or more of the benefactor nodes of the identified online project, by the one of the beneficiary nodes; and
reviewing the updated status in real time.

9. A non-transitory computer-readable storage medium storing computer-executable instructions that when executed cause a computing system to perform a method, the method comprising:
receiving via one or more subscriber channels by a secondary administrator computing device a units of resource from each of two or more of a plurality of benefactor nodes for an identified online project in a beneficiary repository for one of a plurality of beneficiary nodes, based on at least one of a plurality of smart contracts, wherein the one or more subscriber channels are configured with one or more rules or algorithms to restrict access to the plurality of benefactor nodes, the plurality of beneficiary nodes and the secondary administrator computing device that have subscribed in the distributed ledger network;

transferring via the one or more subscriber channels with the secondary administrator computing device one or more digital credit points to the each of the two or more benefactor nodes based on the received units of resource using the at least one of the smart contracts on the distributed ledger network;

monitoring with the secondary administrator computing device the transfer of the one or more digital credit points from the two or more of the plurality of benefactor nodes to the one of the beneficiary nodes on the distributed ledger network;

monitoring with the secondary administrator computing device, redemption of the transferred one or more digital credit points by the one of the beneficiary nodes for the redeemed ones of the transferred units of resource on the distributed ledger network to the one of the beneficiary nodes; and validating with the secondary administrator computing device, based on blockchain code associated with the at least one of the smart contracts, the transferred one or more digital credit points, and the redeemed ones of the units of resource to monitor in real time compliance by the two or more of a plurality of benefactor nodes and the one of the beneficiary nodes using the at least one of the smart contracts on the distributed ledger network.

10. The non-transitory computer readable medium as claimed in claim 9, wherein the benefactor nodes and the beneficiary nodes are registered at a user repository in a primary administrator node, using a unique identifier.

11. The non-transitory computer readable medium as claimed in claim 9, further comprising:
receiving a period update on a status related to the two or more of the benefactor nodes of the identified online project, by the one of the beneficiary nodes;
reviewing the updated status, in real time;
periodically tracking noncompliance by the one of the benefactor nodes; and
periodically tracking usage of the unit of resource by the one of the beneficiary nodes.

12. The non-transitory computer readable medium as claimed in claim 9, wherein an incentive is provided to the benefactor node, based on the unit of resource transferred to the secondary administrator computing device.

* * * * *